United States Patent
Ikeda

[11] Patent Number: 6,049,185
[45] Date of Patent: Apr. 11, 2000

[54] POWER CIRCUIT OF AN AIR CONDITIONER FOR ELECTRIC VEHICLES

[75] Inventor: Hideo Ikeda, Isesaki, Japan

[73] Assignee: Sanden Corporation, Gunma, Japan

[21] Appl. No.: 09/207,573

[22] Filed: Dec. 8, 1998

[30] Foreign Application Priority Data

Dec. 10, 1997 [JP] Japan .................................. 9-340083

[51] Int. Cl.⁷ .................. B60L 1/00; B60H 1/32
[52] U.S. Cl. ................ 318/442; 318/801; 318/810
[58] Field of Search .................. 318/798–803, 318/810, 440, 442; 323/908; 307/109

[56] References Cited

U.S. PATENT DOCUMENTS

| | | | |
|---|---|---|---|
| 4,326,386 | 4/1982 | Tamura | 62/152 |
| 4,482,854 | 11/1984 | Kawada et al. | 318/801 |
| 4,539,821 | 9/1985 | Tamura | 62/228.5 |
| 4,879,639 | 11/1989 | Tsukahara | 363/37 |
| 4,884,185 | 11/1989 | Hubert | 363/56 |
| 5,127,085 | 6/1992 | Becker et al. | 388/903 |
| 5,678,761 | 10/1997 | Ikeda | 237/2 B |
| 5,883,484 | 3/1999 | Akao | 318/700 |

FOREIGN PATENT DOCUMENTS

| | | |
|---|---|---|
| 6-2901 | 1/1994 | Japan . |
| 6-32141 | 2/1994 | Japan . |
| 7-147767 | 6/1995 | Japan . |
| 7-241002 | 9/1995 | Japan . |
| 9-201066 | 7/1997 | Japan . |
| 10-304501 | 11/1998 | Japan . |

OTHER PUBLICATIONS

Japanese Patent Office, Patent Abstracts of Japan, Publication No. 07241002, Sep. 12, 1995.

*Primary Examiner*—Bentsu Ro
*Attorney, Agent, or Firm*—Baker Botts, L.L.P.

[57] ABSTRACT

A power circuit of an air conditioner for electric vehicles includes a high voltage power source, a drive circuit for driving a compressor motor, and a capacitor connected between a positive side coupling and a negative side coupling to the high voltage power source. The power circuit comprises a diode provided in the positive side coupling and a switching element provided in the negative side coupling. The capacitor is charged by the pulsed operation of the switching element which is controlled by an operation control device. The capacitor may be quickly charged in a stable condition without burdening the devices in the power circuit. Consequently, the air conditioner may be quickly started.

12 Claims, 3 Drawing Sheets

POWER CIRCUIT OF AN AIR CONDITIONER FOR ELECTRIC VEHICLES

BACKGROUND OF THE INVENTION

1. Field of the Invention

The present invention relates to a power circuit of an air conditioner for an electric vehicle, and, more specifically, to a power circuit supplying a high voltage direct current from a high voltage power source to a drive circuit for driving a compressor of an air conditioner for the electric vehicle.

2. Description of the Related Art

A conventional power circuit of an air conditioner for an electric vehicle is constructed, for example, as depicted in FIG. 3. In FIG. 3, air conditioner 21 includes a compressor 22, a compressor motor 23 connected to compressor 22, a power circuit 24 supplying a high voltage direct current from a high voltage power source 25 to a drive circuit comprised of an inverter 26, a positive side current interrupting device composed of a switch 27a interposed in a positive side coupling 28a from high voltage power source 25, a negative side current interrupting device composed of a switch 27b interposed in a negative side coupling 28b, and a short detecting circuit 29 connected between the negative side coupling 28b and ground 30 for determining the existence of a short by detecting a short resistance therebetween. High voltage power source 25 also supplies a high voltage direct current to an operation control device 31 that controls the operation of the electric vehicle.

Power circuit 24 has a diode D coupled in the positive side coupling 28a of the positive side of high voltage power source 25, a capacitor 32 connected between the positive side coupling 28a and the negative side coupling 28b for storing current, a discharge resistor 33 connected between positive side coupling 28a and negative side coupling 28b for discharging capacitor 32, and a charge switch 34 connected in series with a charge resistor 35 and between both ends of switch 27a. Switch 27a and charge switch 34, connected to charge resistor 35, are connected in parallel relative to diode D. Diode D prevents a reverse connection, i.e., interrupting the circuit on the air conditioner side 61 when the positive side and the negative side of power source 25 are reversely connected. Power circuit 24 further includes a motor control circuit 36. Motor control circuit 36 controls the opening and closing operation of switches 27a and 27b, charge switch 34, and the driving of inverter 26, in response to the signals from short detecting circuit 29 or the detected charged condition of capacitor 32.

Between motor control circuit 36 and each portion of the circuit are connected: signal wires S2 and S3 connected to short detecting circuit 29 for sending a drive signal and receiving a detected short signal, a signal wire S4 connected to capacitor 16 for inputting the detected charged voltage, a signal wire S5 connected to inverter 26 for transmitting a dive control signal, a signal wire S6 connected to charge switch 34 for transmitting an open/close operation signal, a signal wire S7 connected to the positive side switch 27a for transmitting an open/close operation signal, and a signal wire S8 connected to the negative side switch 27b for transmitting an open/close operation signal.

In power circuit 24, the charging of capacitor 32 occurs as follows. When the high voltage direct current from high voltage power source 25 is initially transmitted into air conditioner 21, if the high voltage direct current is directly transmitted to diode D by closing switches 27a and 27b, which are controlled by motor control circuit 36, excessive current may instantaneously flow in diode D, thereby breaking diode D and causing the life of capacitor 32 to potentially decrease. Therefore, motor control circuit 36 closes charge switch 34 and negative side switch 27b by the operation signals transmitted through wires S6 and S8 and opens positive side switch 27a in response to the operation signal transmitted through wire S7. The current from high voltage power source 25 flows through charge resistor 35 and thus capacitor 32 is gradually charged. After capacitor 32 is sufficiently charged, positive side switch 27a is closed in response to the operation signal transmitted through wire S7. In motor control circuit 36, when the capacitor 32 is completely charged, as recognized through signal wire S4, charge switch 34 is then opened in response to the operation signal transmitted through wire S6. After positive side switch 27a is closed in response to the operation signal transmitted through wire S7, inverter 26 is driven in response to the operation signal transmitted through wire S5.

When a short in the air conditioner side 61 is detected by short detecting circuit 29, motor control circuit 36 opens all switches 34, 27a and 27b in response to the operation signals transmitted through wires S6, S7 and S8. Motor control circuit 36 then drives short detecting circuit 29 in response to the driving signal transmitted through wire S2, and receives a short detection signal from short detecting circuit 29 through wire S3.

In such a conventional power circuit 24 for electric vehicles, because diode D must have a sufficiently large capacity to withstand a high voltage direct current from high voltage power source 25, a large diode D of significant cost is required. Moreover, because charge switch 34 and the positive side and negative side switches 27a and 27b are required, and signal wires S6, S7 and S8 connect between the respective switches and motor control circuit 36 to prevent reduction of the life of capacitor 32. Therefore, the number of parts required is also high and the circuit is more complicated, thereby further increasing the cost and size of the circuit.

Moreover, although a high voltage power source mounted in an electric vehicle is usually insulated, because an electric shock may occur if the insulation is broken, short detecting circuit 29 is needed in the circuit. After recognition of no detected short, inverter 26 may be driven in response to the control signal of motor control circuit 36 in order to prevent occurrence of an electric shock. In such a system, when short detection is carried out on only the air conditioner side 61, the circuit of the air conditioner side 61 may be interrupted from the circuit of the operation control device side 51. Therefore, at least negative side switch 27b is required to achieve such an interruption. Thus, these switches are necessary in the known circuit.

SUMMARY OF THE INVENTION

Accordingly, it is an object of the present invention to provide a power circuit of an air conditioner for an electric vehicle, which may charge a capacitor quickly and stably without burdening other devices in the vehicle and which may have an uncomplicated structure.

To achieve the foregoing and other objects, a power circuit of an air conditioner for electric vehicles according to the present invention is provided. The power circuit of an air conditioner for electric vehicles according to the present invention includes a high voltage power source supplying a high voltage direct current to a compressor of an air conditioner mounted in an electric vehicle, a drive circuit receiving the high voltage direct current for driving the compressor, a compressor motor connected to the drive circuit, and a capacitor connected between a positive side coupling to the high voltage power source and a negative side coupling to the high voltage power source for charging the high voltage direct current. The drive circuit may comprise an inverter. The power circuit comprises a diode provided in the positive side coupling to the high voltage power source, and a switching element provided in the negative side coupling to the high voltage power source.

The power circuit further may comprise an operation control circuit (for example, incorporated in a motor control circuit) for controlling the operation of the switching element in response to a charged condition of the capacitor. The switching element functions in pulsed operation in response to an operation control signal transmitted from the operation control circuit while the capacitor is charging. In such a configuration, preferably the operation control circuit detects a charged voltage of the capacitor, and generates a pulse width in the pulsed operation of the switching element in proportion to the charged voltage of the capacitor.

In the power circuit, the power circuit further may comprise a short detecting circuit connected between the negative side coupling to the high voltage power source and a ground connection. The high voltage power source may be connected to an operation control device that controls operation of the electric vehicle. Further, a discharge resistor may be connected between the positive side coupling and the negative side coupling in parallel to the capacitor.

Further, in the power circuit, positive side and negative side switches and a charge switch, each of which is required in a known circuit, are unnecessary. The capacitor may be charged by the operation of the one switching element provided in the negative side coupling to the high voltage power source. Therefore, the power circuit may include a less complicated structure. Moreover, because the switching element is driven in a pulsed operation and the pulse width may be controlled in response to the charged condition of the capacitor, preferably, in proportion to the charged voltage of the capacitor: the capacitor may be charged quickly and stably without burdening the various devices in the circuit. Consequently, charging may be quickly completed, and the air conditioner may be quickly started. Thus, the interior temperature in the vehicle may quickly reach a target temperature.

Further, in the power circuit, a diode is provided in the positive side coupling to the high voltage power source in addition to the switching element provided in the negative side coupling. Because the diode and the switching element may easily interrupt the circuit of the air conditioner side from the circuit of the high voltage power source when a short is detected by the short detecting circuit, short detection is only needed on the air conditioner side and may be performed easily and accurately. The capacity and the size of the diode may be small. Consequently, because of the small size and capacity of the diode, and the use of the switching element, the life of the capacitor may be lengthened.

Thus, the power circuit may be a less complicated structure, and the diode used may be of small capacity and inexpensive. Accordingly, superior performance with an inexpensive power circuit of an air conditioner for electric vehicles is achieved.

Further objects, features, and advantages of the present invention will be understood from the following detailed description of the preferred embodiment of the present invention with reference to the accompanying figures.

BRIEF DESCRIPTION OF THE DRAWINGS

A preferred embodiment of the invention is now described with reference to the accompanying figures, which is given by way of example only, and is not intended to limit the present invention.

DETAILED DESCRIPTION OF PREFERRED EMBODIMENTS

Figure 1:
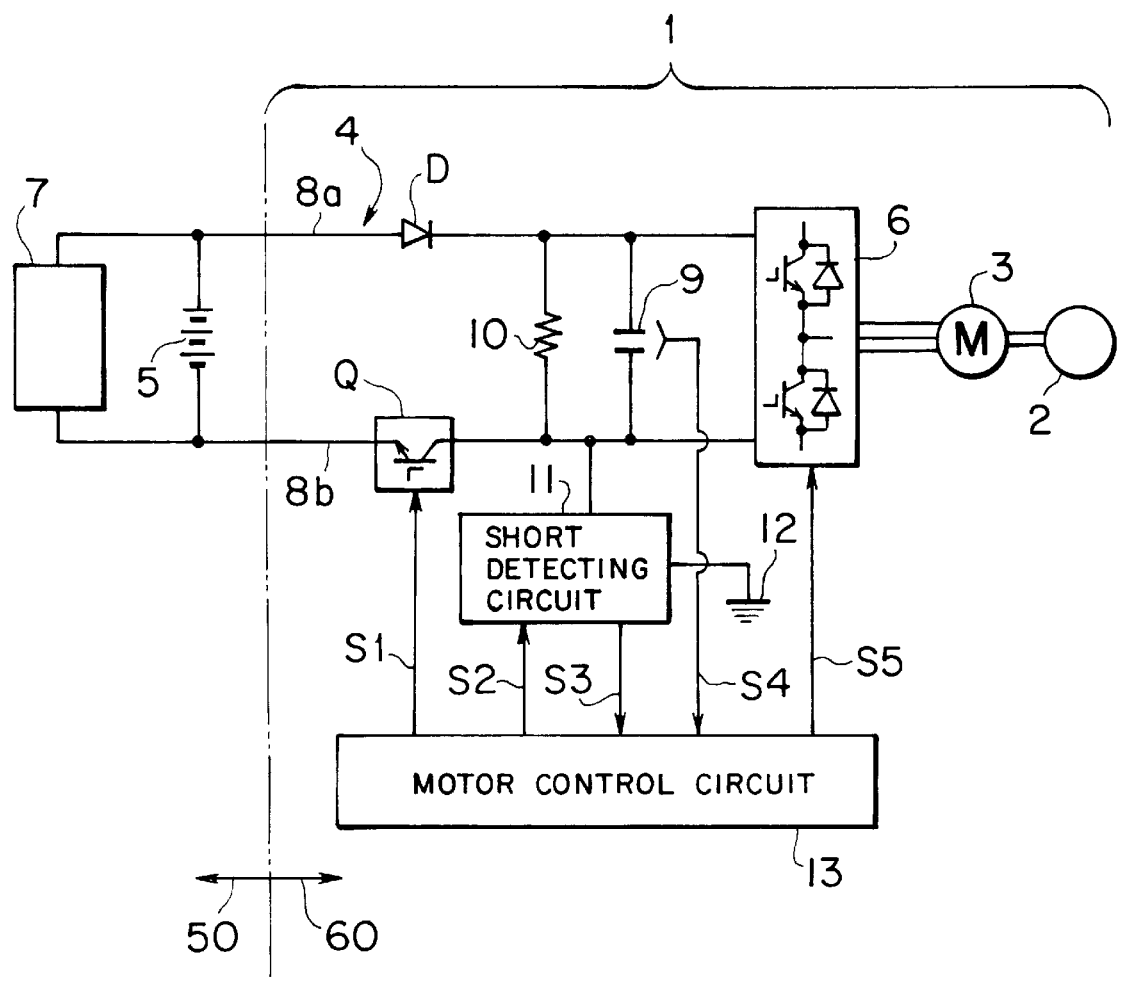
FIG. 1 is a block diagram of a power circuit of an air conditioner for electric vehicles according to an embodiment of the present invention.

FIG. 1 is a block diagram showing an embodiment of a power circuit of an air conditioner for electric vehicles according to the present invention. An air conditioner 1 mounted in an electric vehicle includes a compressor 2, a compressor motor 3 connected to compressor 2, a power circuit 4 supplying a high voltage direct current from a high voltage power source 5 to a drive circuit comprised of an inverter 6. High voltage power source 5 also supplies a high voltage direct current to an operation control device 7 that controls operation of the electric vehicle. Positive side coupling 8a and negative side coupling 8b of high voltage power source 5 are connected to inverter 6, respectively. A capacitor 9 is connected between positive side coupling 8a and negative side coupling 8b. Capacitor 9 is charged by the high voltage direct current from high voltage power source 5. A discharge resistor 10 is connected between positive side coupling 8a and negative side coupling 8b and in parallel to capacitor 9. Discharge resistor 10 discharges capacitor 9. A short detecting circuit 11 is connected between negative side coupling 8b and a ground connection 12 for determining the existence of a short by detecting a short resistance therebetween.

Figure 3:
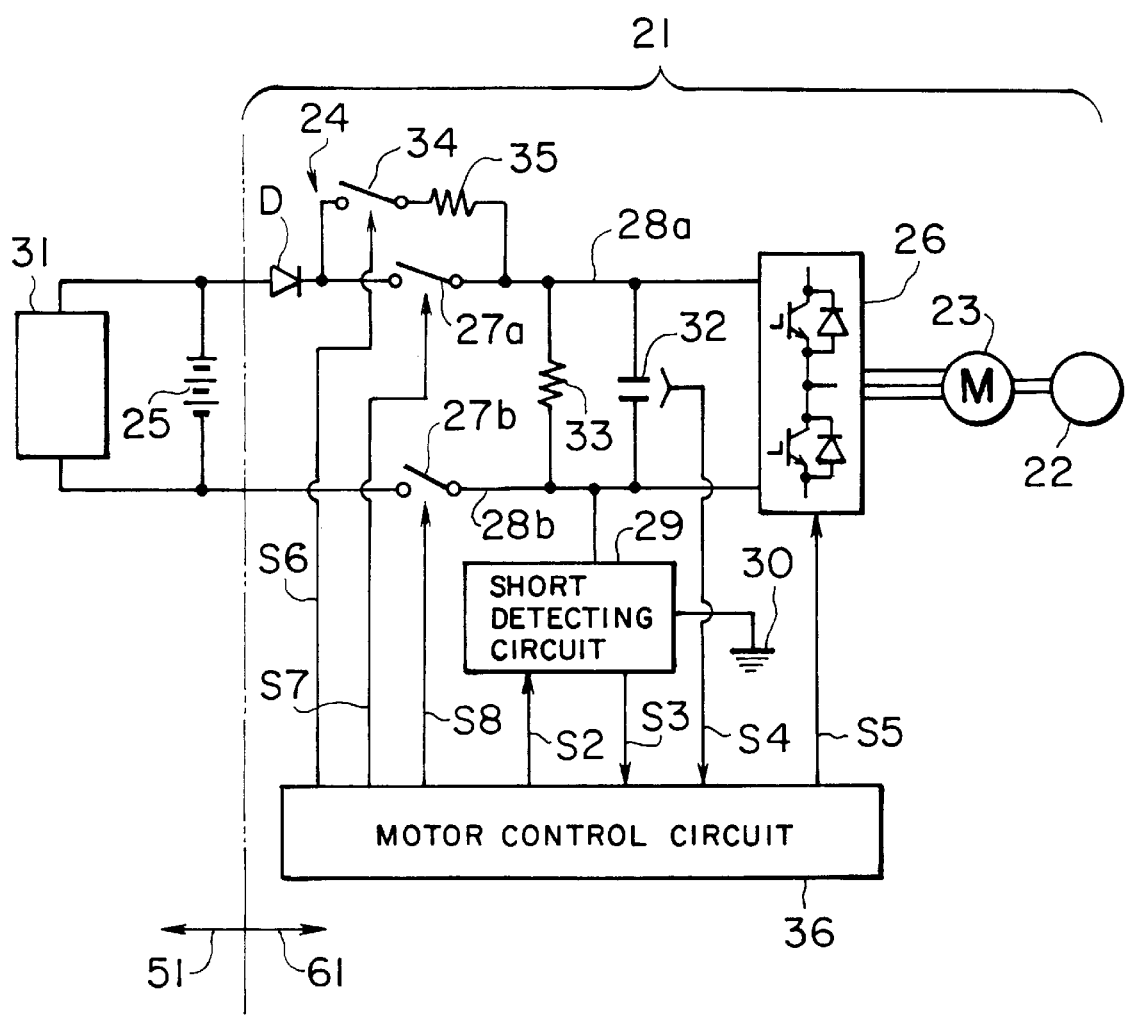
FIG. 3 is a block diagram of a known power circuit of an air conditioner for electric vehicles.

A diode D is provided in positive side coupling 8a. Diode D prevents a reverse connection that occurs when the positive side and the negative side of power source 5 are reversely connected. A switching element Q is provided in negative side coupling 8b. Switching element Q functions in pulsed operation to charging capacitor 9. Although an insulated gate bipolar transistor-type (IGBT-type) switching element is used as switching element Q in this embodiment, other types of switching elements, such as a field effect transistor-type (FET-type) switching element, may be used. Thus, in this power circuit 4, no switches, such as those provided in the known circuit shown in FIG. 3, are required.

Motor control circuit 13 is provided as an operation control circuit that controls the operation of switching element Q, the drive of short detecting circuit 11, and inverter 6. The signal generated when capacitor 9 is charged and the signal generated when short detecting circuit 11 detects a short are both input to motor control circuit 13. Signal wires S2 and S3 are connected between motor control circuit 13 and short detecting circuit 11 to transmit a signal to short detecting circuit 11 and to receive a short signal detected from short detecting circuit 11. Signal wire S4 is connected between motor control circuit 13 and capacitor 9 for transmitting a signal representing the detected charge from capacitor 9. Signal wire S5 is connected between motor control circuit 13 and inverter 6 to transmit a drive control signal from motor control circuit 13 to inverter 6. Signal wire S1 is connected between motor control circuit 13 and switching element Q to transmit a drive control signal from motor control circuit 13 to switching element Q.

When capacitor 9 is charging, switching element Q functions in pulsed operation in response to an operation control signal that is transmitted from motor control circuit 13 through signal wire S1. Switching element Q repeats on/off operation. The charge voltage of capacitor 9 is detected and input to motor control circuit 13 via signal wire S4. The pulse width of the pulse operation of switching element Q is controlled by motor control circuit 13 in proportion to the charged voltage of capacitor 9. Therefore, when the charged voltage is small, the pulse width is reduced, and when the charged voltage is large, the pulse width is increased. Because the amount of the electric current used to charge capacitor 9 is controlled in response to the charged condition of capacitor 9, the charging of capacitor 9 may be quickly completed without the interruption of switching element Q.

By charging capacitor 9 with the pulsed operation of switching element Q, when the charged voltage of capacitor 9 is small, generally a large amount of electric current flows through diode D and switching element Q. Therefore, when the charged voltage is small, the pulse width may be reduced, so that switching element Q may not be interrupted by the charging of capacitor 9. If a large pulse width is employed from the start of the charging, switching element Q is likely to be interrupted. On the other hand, when the charged voltage of capacitor 9 increases, the pulse width may be increased, so that the charging of capacitor 9 may be completed as rapidly as possible. If a small pulse width is maintained during the entire time it takes to charge capacitor 9, the time it takes to charge capacitor 9 may not be reduced. Thus, because the charging of capacitor 9 is performed while the pulse width of the operation of switching element Q is controlled in response to the detected charged voltage of capacitor 9, the charging of capacitor 9 may be quickly completed at a stable condition without burdening the other devices in the circuit.

After capacitor 9 is charged to a predetermined voltage, switching element Q may be maintained in a continuously "ON" mode, inverter 6 may be driven by the drive signal transmitted from motor control circuit 13 through signal wire S5, and the compressor motor 3 may be driven by inverter 6.

Discharge resistor 10 prevents problems due to a residual electric charge in capacitor 9, for example, at the time of maintenance. When residual electric charge in capacitor 9 is discharged, motor control circuit 13 transmits an operation control signal to switching element Q via signal wire S1 to turn switching element Q off. When switching element Q is off, the residual electric charge in capacitor 9 is discharged through discharge resistor 10.

When a short is detected by short detecting circuit 11, motor control circuit 13 transmits an operation control signal to switching element Q via signal wire S1 to turn switching element Q off. When switching element Q is off, short detecting circuit 11 is driven by the operation control signal transmitted from motor control circuit 13 through signal wire S2, and the signal that a short has been detected is transmitted to motor control circuit 13 through signal wire S3. When a short is detected, because the detected current due to the short is prevented from flowing into the operation control device side 50 of power source 5 and to control device 7, short detection may be performed only on the air conditioner side 60 readily and accurately. If a large amount of short current is detected, a drive control signal for stopping compressor motor 3 may be transmitted to inverter 6, or a user may be informed of the detection of the short by appropriate means, e.g., by a warning light.

Figure 2A:
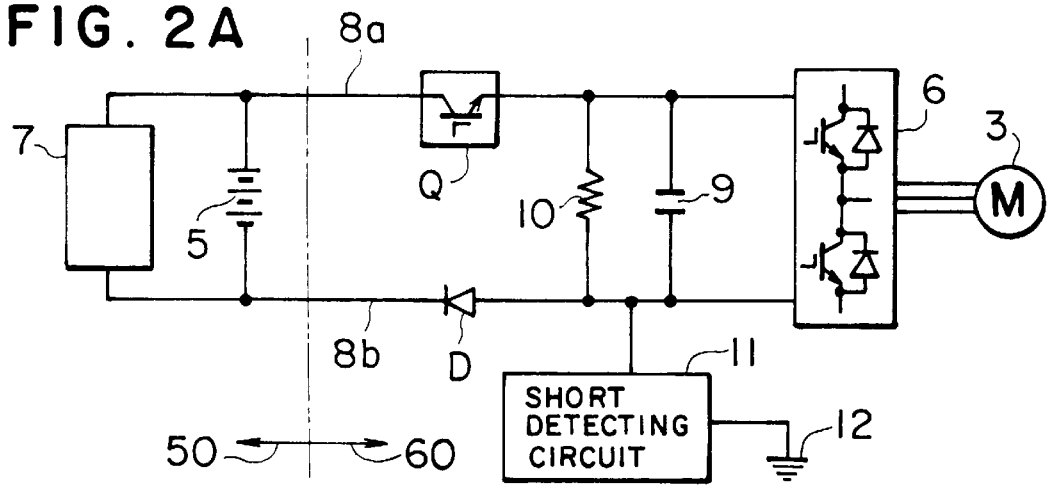
FIGS. 2A–2C are block diagrams of power circuits that are comparative examples of the present invention.
Figure 2B:
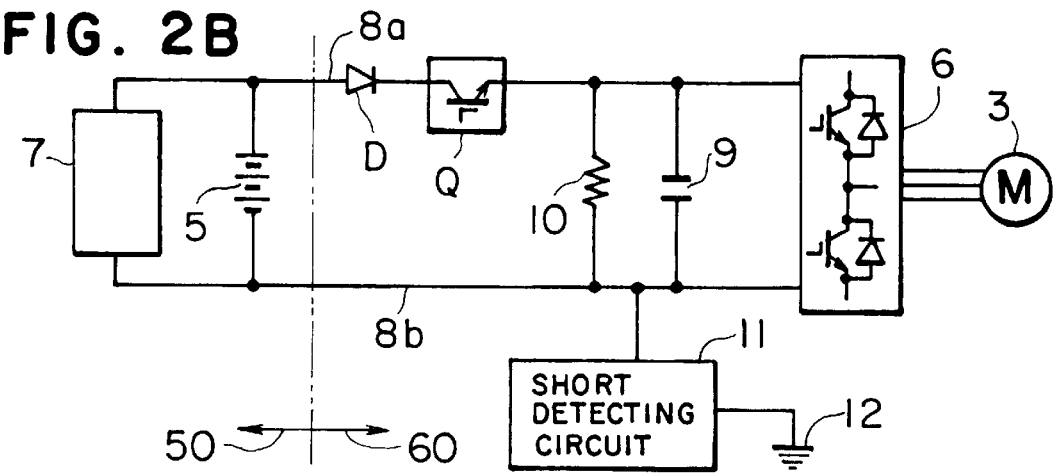
Figure 2C:
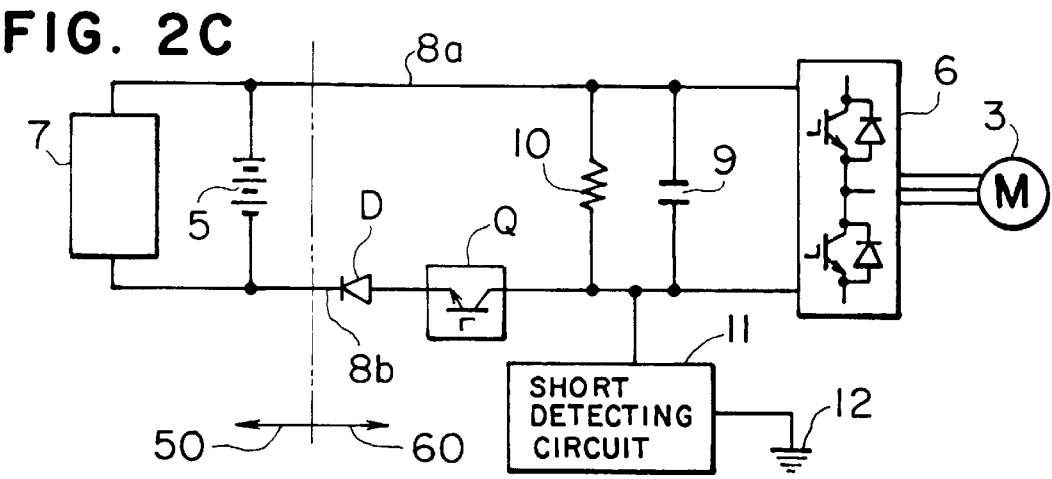

FIGS. 2A to 2C depict block diagrams of comparative examples of power circuits that do not include advantages of the power circuit of the present invention depicted in FIG. 1. Although capacitor 9 may be changed by means of any of the power circuits of the comparative examples of FIGS. 2A to 2C, because a short may flow to the operation control device side 50 when a short is detected, short detection is not only on the air conditioner side 60 of the comparative examples of FIGS. 2A to 2C. In the comparative example depicted in FIG. 2A, a detected short current may flow to the operation control device side 50 through diode D connected to the negative side of high voltage power source 5. In the comparative example depicted in FIG. 2B, a detected short current may directly flow to the operation control device side 50 from the negative side of high voltage power source 5. In the comparative example depicted in FIG. 2C, a detected short current may flow to the operation control device side 50 from the positive side of high voltage power source 5 through inverter 6 or discharge resistor 10. Therefore, in any of the comparative example power circuits of FIGS. 2A to 2C, it cannot be determined whether the short was generated on the operation control device side 50 or on the air conditioner side 60. On the other hand, in the power circuit depicted in FIG. 1, a short only on the air conditioner side 60 may be detected readily and accurately, as mentioned above.

Although only one embodiment of the present invention has been described in detail herein, the scope of the invention is not limited thereto. It will be appreciated by those skilled in the art that various modifications may be made without departing from the scope of the invention. Accordingly, the embodiment disclosed herein is only exemplary. It is to be understood that the scope of the invention is not to be limited thereby, but is to be determined by the claims which follow.

What is claimed is:

1. A power circuit of an air conditioner for an electric vehicle comprising a high voltage power source supplying a high voltage direct current having a first amplitude to a compressor of an air conditioner mounted in said electric vehicle, a drive circuit receiving said high voltage direct current for driving said compressor, a compressor motor connected to said drive circuit, and a capacitor connected between a positive side coupling to said high voltage power source and a negative side coupling to said high voltage power source for charging said capacitor, said power circuit further comprising:

a diode provided in said positive side coupling to said high voltage power source; and means for pulsing said direct current, such that a pulse width of said pulsed current is proportional to a charge of said capacitor, wherein a second amplitude of said pulsed current is less than said first amplitude of said direct current.

2. The power circuit according to claim 1, wherein said power circuit further comprises an operation control circuit for controlling the operation of said means for pulsing said direct current in response to a charged condition of said capacitor, wherein said means for pulsing said direct current functions in pulsed operation in response to an operation control signal transmitted from said operation control circuit when said capacitor is charging.

3. The power circuit according to claim 1, wherein said power circuit further comprises a short detecting circuit connected between said negative side coupling to said high voltage power source and a ground connection.

4. The power circuit according to claim 1, wherein said high voltage power source is connected to an operation control device that controls operation of said electric vehicle.

5. The power circuit according to claim 1, wherein a discharge resistor is connected between said positive side coupling and said negative side coupling, and further wherein said resistor is in parallel to said capacitor.

6. The power circuit according to claim 1, wherein said drive circuit comprises an inverter.

7. A power circuit of an air conditioner for an electric vehicle comprising a high voltage power source supplying a high voltage direct current having a first amplitude to a compressor of an air conditioner mounted in said electric vehicle, a drive circuit receiving said high voltage direct current for driving said compressor, a compressor motor connected to said drive circuit, and a capacitor connected between a positive side coupling to said high voltage power source and a negative side coupling to said high voltage power source for charging said capacitor, said power circuit further comprising:

a diode provided in said positive side coupling to said high voltage power source; and a current limiting element pulsing said direct current such that a pulse width of said pulsed current is proportional to a charge on said capacitor, wherein a second amplitude of said pulsed current is less that said first amplitude of said direct current.

8. The power circuit according to claim 7, wherein said power circuit further comprises an operation control circuit for controlling the operation of said current limiting element, pulsing said direct current in response to a charged condition of said capacitor, wherein said current limiting element pulsing said direct current functions in pulsed operation in response to an operation control signal transmitted from said operation control circuit when said capacitor is charging.

9. The power circuit according to claim 7, wherein said power circuit further comprises a short detecting circuit connected between said negative side coupling to said high voltage power source and a ground connection.

10. The power circuit according to claim 7, wherein said high voltage power source is connected to an operation control device that controls operation of said electric vehicle.

11. The power circuit according to claim 7, wherein a discharge resistor is connected between said positive side coupling and said negative side coupling, and further wherein said resistor is in parallel to said capacitor.

12. The power circuit according to claim 7, wherein said drive circuit comprises an inverter.

* * * * *